Sept. 12, 1967   T. J. RAHAIM   3,341,172
FLUID MACHINE CASING SEALING STRUCTURE
Filed June 24, 1965   3 Sheets-Sheet 1
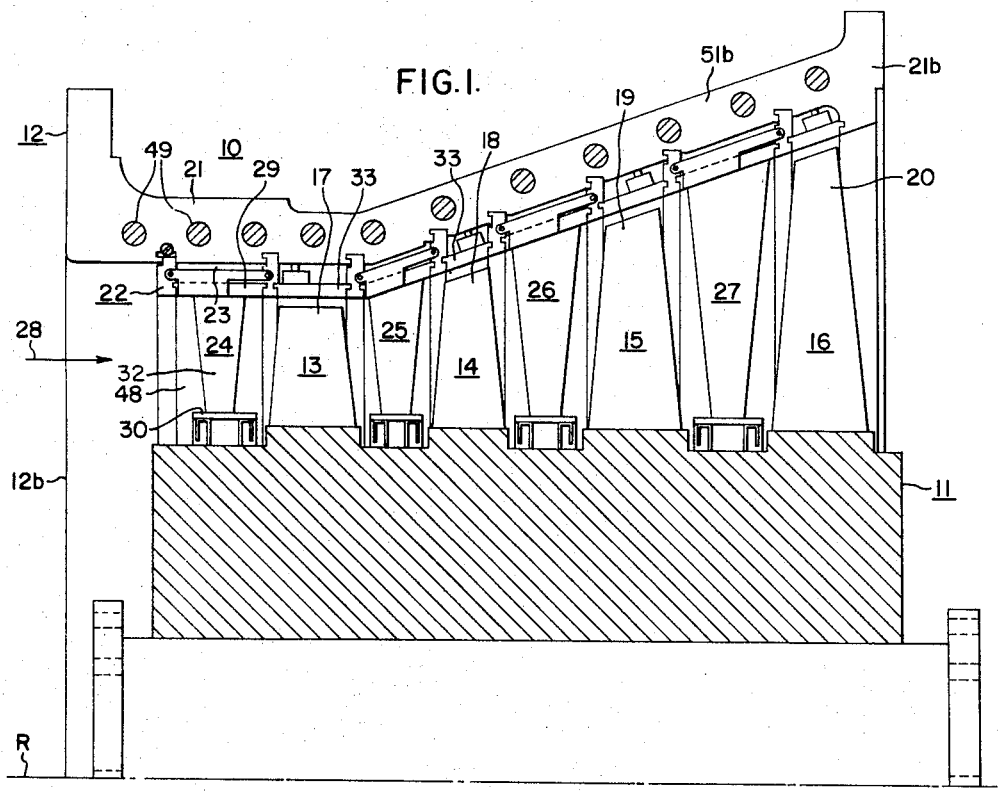
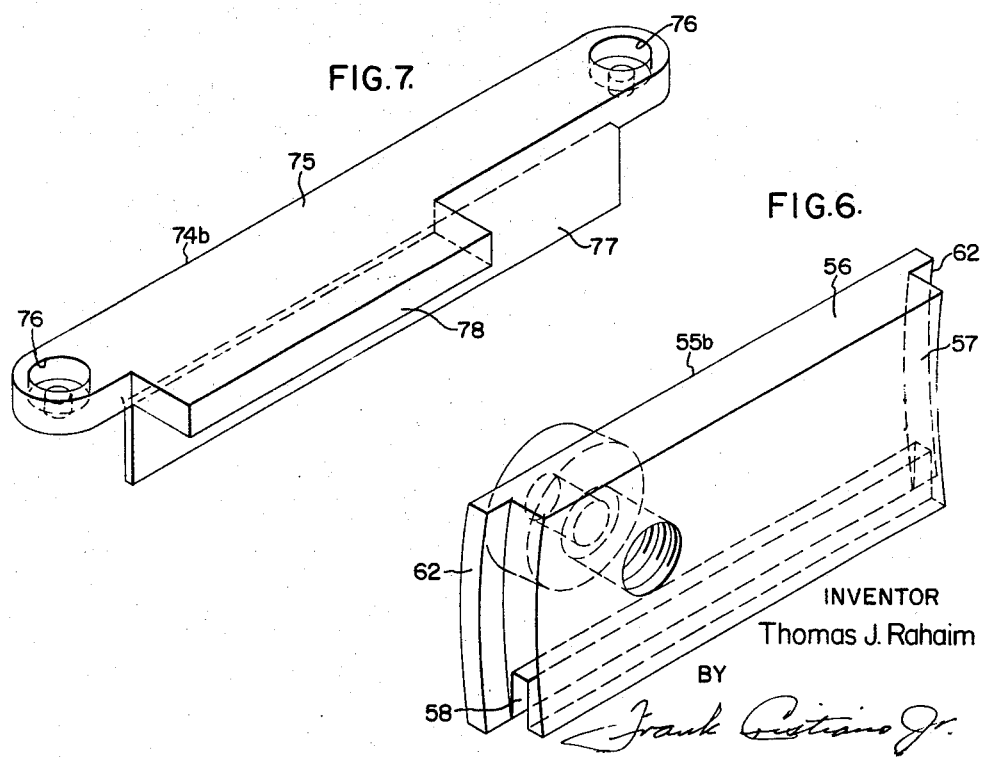
INVENTOR
Thomas J. Rahaim
BY
Frank Cristiano Jr.

Sept. 12, 1967   T. J. RAHAIM   3,341,172
FLUID MACHINE CASING SEALING STRUCTURE
Filed June 24, 1965   3 Sheets-Sheet 2

United States Patent Office 3,341,172
Patented Sept. 12, 1967

3,341,172
FLUID MACHINE CASING SEALING STRUCTURE
Thomas J. Rahaim, Claymont, Del., assignor to Westinghouse Electric Corporation, Pittsburgh, Pa., a corporation of Pennsylvania
Filed June 24, 1965, Ser. No. 466,661
12 Claims. (Cl. 253—39)

This invention relates to a fluid sealing arrangement and has for an object to provide an improved sealing arrangement for restricting fluid flow past associated structure that expands and contracts due to heating and cooling thereof respectively.

In some elastic fluid utilizing machines, such as turbines and compressors of the axial flow type, and more particularly in gas turbines, inner and outer tubular casings are utilized, and the casings are divided in a horizontal plane for ease of assembly and service. The inner casing halves comprise a plurality of axially aligned semi-circular rings supported in radially inwardly spaced relation with the outer casing and disposed with their ends in spaced juxtaposition. Thus a pair of diametrically opposed elongated spaces are provided adjacent the horizontal plane to accommodate expansion of the rings in service.

Many arrangements have heretofore been proposed to resiliently seal the space formed by the adjacent ends of each pair of rings and to maintain said seal during expansion and contraction of the rings during heating and cooling thereof, respectively. One such arrangement is shown and described in Ronald L. Tassoni Patent No. 2,991,045, entitled Sealing Arrangement for a Divided Tubular Casing, and assigned to the same assignee as this invention. The arrangement disclosed in the above patent is highly effective to minimize leakage of the hot motive gases past flexible metal seal members during operation. However, the metal seal members cooperate with slots formed in the upper and lower half ring members and, during assembly of the upper casing half on the lower casing half, considerable care must be taken to insure that the seal members and slots are brought into proper registry with each other. Failure to attain such registry will crush or otherwise damage the relatively fragile seal members and thus fail to provide the required seal.

It is an object of this invention to provide an arrangement employing resilient seal structure for providing a seal between two expansible and contractible members that substantially eliminates the possibility of damage and/or misalignment of the seal structure.

A further object of this invention is to provide an arrangement employing resilient seal structure for providing a seal between the juxtaposed end portions of a pair of divided ring members, which arrangement employs a pair of non-resilient members having cooperably abutting planar surfaces.

A more specific object is to provide an axial flow machine casing structure divided axially into upper and lower halves with similarly divided ring members disposed within the casing halves, wherein the resilient seal structures for the ring members cooperate with non-resilient members carried in each casing half and wherein the resilient seal structures are disposed in sealing registry with the non-resilient members before the upper and lower casing halves are brought into registry with each other.

A still more specific object is to provide an axial flow machine casing structure divided into upper and lower halves with similarly divided ring members forming the flow path for flow of hot motive fluid, wherein the resilient seal structure for permitting expansion and contraction of the rings with minimum leakage of fluid therethrough is disposed out of the axial horizontal plane of joinder of the two casing halves.

Briefly, in accordance with the invention, the upper and lower casing halves of a hot fluid utilizing machine, such as a gas turbine, are provided with mating planar surfaces lying in an axial horizontal plane and a plurality of annular arrays of divided pairs of ring members of somewhat less arcuate length than 180° are disposed in the associated casing halves. The casing halves and ring member assemblies may be substantially identical. Each ring member half is free to elongate or contract peripherally and beyond each of the end portions of the ring member halves a non-resilient arcuate block member is connected to the associated casing half with its planer face in the same plane as the mating casing surfaces. The ring member half end portions and the juxtaposed block members are provided with opposed slots within which a flexible or resilient seal strip member is received and employed to slide or yield, as required to take up expansion of the associated ring member half.

At assembly of the upper casing half to the lower casing half, the planar faces of the blocks in the upper casing half are brought into abutment with the planar faces of the blocks in the lower casing half to complete the sealing of the divided ring members.

With this arrangement, the fragile seal members are protected against accidental damage at assembly of the casing halves and a good reliable seal is attained with positive assurance.

These and other objects of the present invention will become more apparent from the following detailed description thereof taken in conjunction with the accompanying drawings, in which:

FIGURE 1 is a horizontal radial sectional view of a gas turbine incorporating the invention, with the upper casing half removed;

FIG. 6 is a perspective view of one of the spacer ring seal blocks; and

FIG. 7 is a perspective view of one of the diaphragm shroud ring seal blocks.

Figure 2:
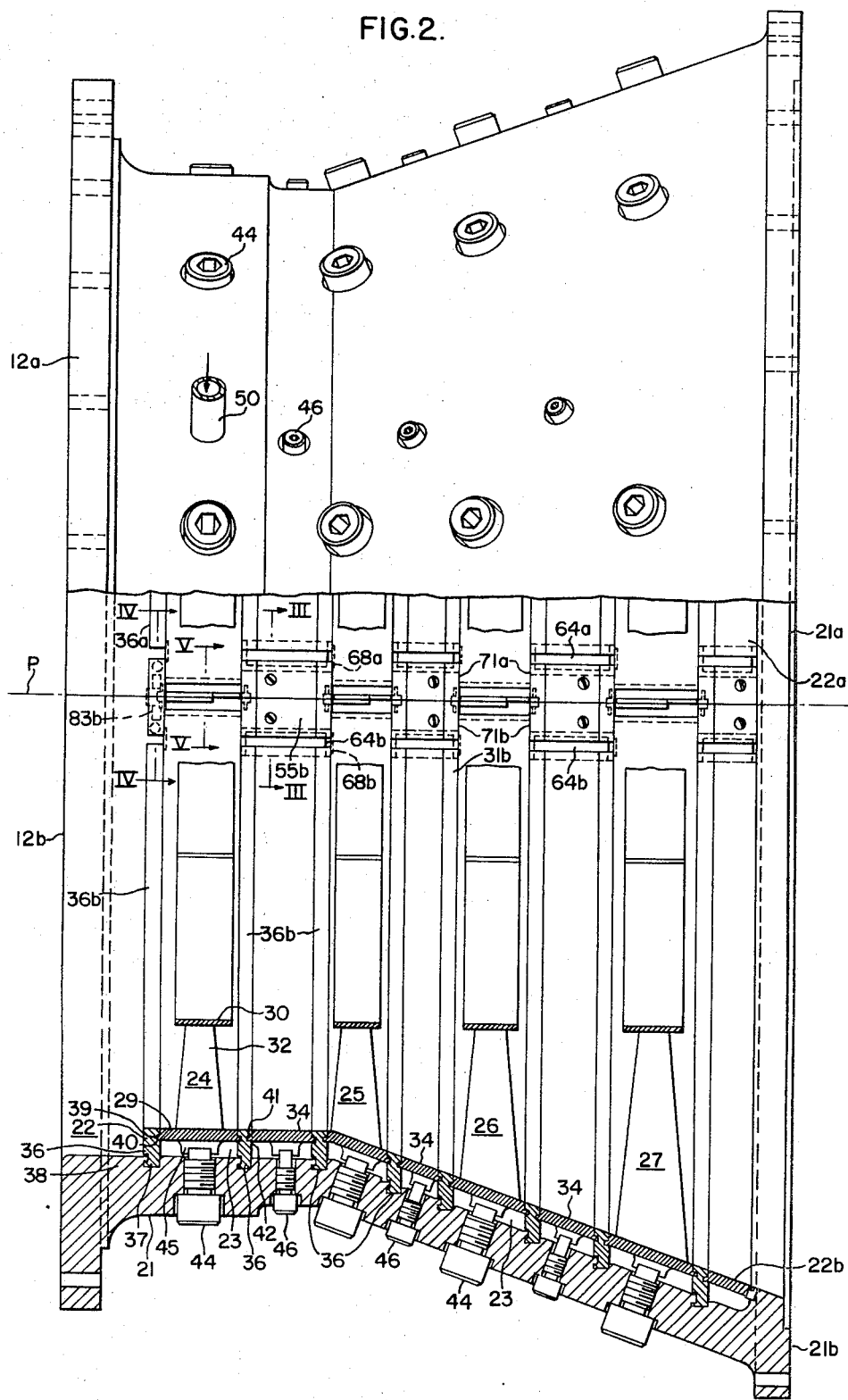
FIG. 2 is an enlarged side view of the gas turbine casing structure shown in FIG. 1, with the lower casing half shown in section.

Referring to the drawings in detail, in FIG. 1 there is shown a gas turbine 10 of the multi-stage axial flow type having a rotor 11 rotatably supported in any suitable manner (not shown) within a tubular casing structure 12.

The rotor 11 is provided with a plurality of axially spaced annular rows (four in this instance) 13, 14, 15, and 16 of radially extending blades 17, 18, 19 and 20 of increasing length from left to right.

The casing structure 12 is of the double walled type and includes an outer tubular casing 21 and an inner tubular casing structure 22 spaced radially inwardly from the outer casing 21 and jointly therewith defining an annular space 23.

A plurality of axially spaced stationary diaphragm structures (four in this instance) 24, 25, 26 and 27 are supported by the inner casing structure 22 and interposed immediately upstream of the corresponding rotor blade rows 13, 14, 15 and 16, respectively, with respect to the direction of motive gas flow, indicated by the arrow 28. Each of the diaphragm structures comprises an outer shroud ring structure 29, an inner segmented shroud ring structure 30 and an annular array of radially extending vanes 32 interposed therebetween.

The inner casing structure 22, as best seen in FIG. 2, comprises the outer shroud rings 29, a plurality of spacer rings 34 interposed between the shroud rings 29 and a plurality of retainer rings 36. The retainer rings 36 are slidably connected to the inner surface of the outer casing 21 by peripheral tenon portions 37 received in mating dovetail grooves 38 of annular shape formed in the outer casing. The diaphragms are disposed between two retainer rings 36 and slidably held therein by peripheral tenon portions 39 received in mating dovetail grooves 40 of annular shape formed in the retainer rings. All of the retainer rings 36, except the first in the series (at the left in FIG. 2) are provided with a second annular dovetail groove 41 engaging peripheral tenon portions 42 formed on the spacer rings 34 and slidably holding the spacer rings.

The diaphragms 24, 25, 26 and 27 are held against rotation by an annular array of bolts 44 carried in the outer casing 21 and extending radially through the annular space 23 into abutment with radially outwardly extending lugs 45 carried by the shroud rings 29. In a similar manner the spacer rings 34 are held against rotation by an annular array of bolts 46. Accordingly, the inner casing structure 22 and the rotor structure 11 jointly define as annular flow passage 48 for the motive gas flow 28 as it flows past the diaphragm vanes and the rotor blades to drive the rotor, as well known in the art.

For facility of assembly and service, the casing structure 12 is divided into an upper half portion 12a and a lower half portion 12b, preferably along a horizontal plane P (FIG. 2) lying in the axis of rotation R of the rotor 11 (FIG. 1). This arrangement is provided by dividing the diaphragms 24–27, the retainer rings 36, the spacer rings 34 and the outer casing 21 into upper and lower mating arcuate portions. The two halves are bolted together by a plurality of bolts 49 extending through the upper and lower portions of the outer casing 21, as indicated in FIG. 1. Accordingly, substantially all of the upper components will bear the suffix A while their lower counter parts will bear the suffix B.

Figure 5:
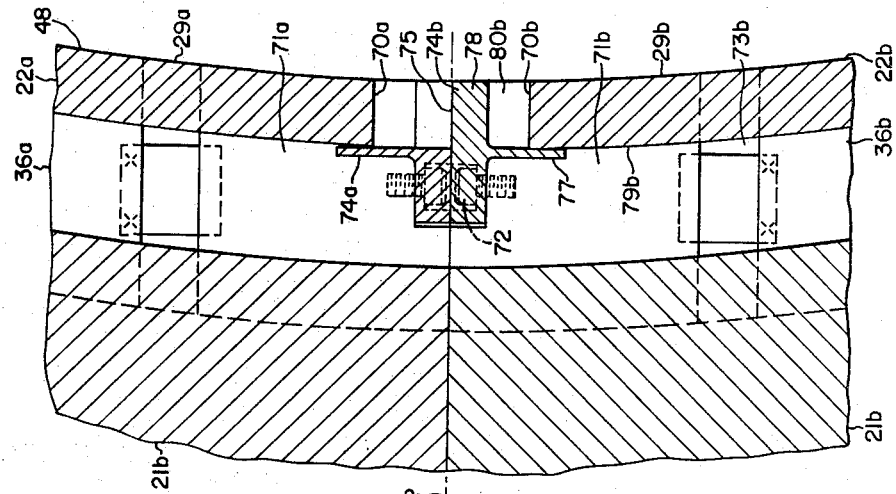
FIGS. 3, 4 and 5 are further enlarged fragmentary views taken on lines III—III, IV—IV and V—V of FIG. 2.
Figure 4:
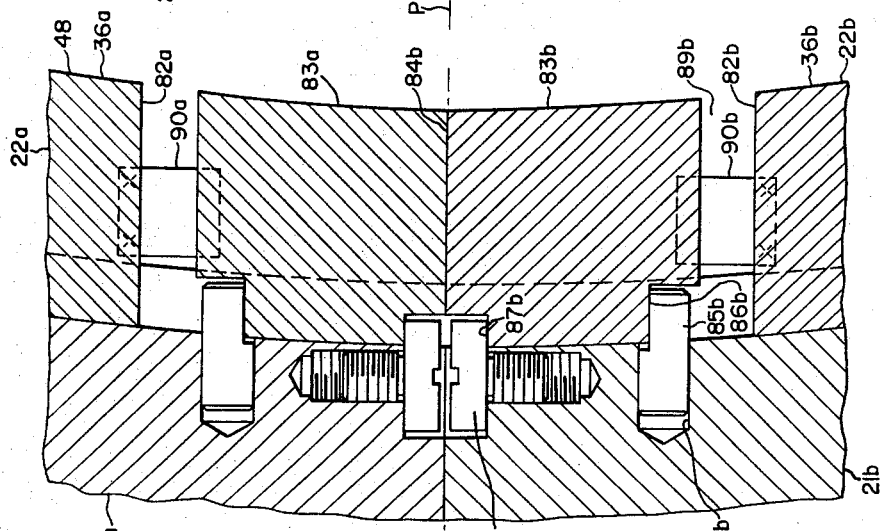
Figure 3:
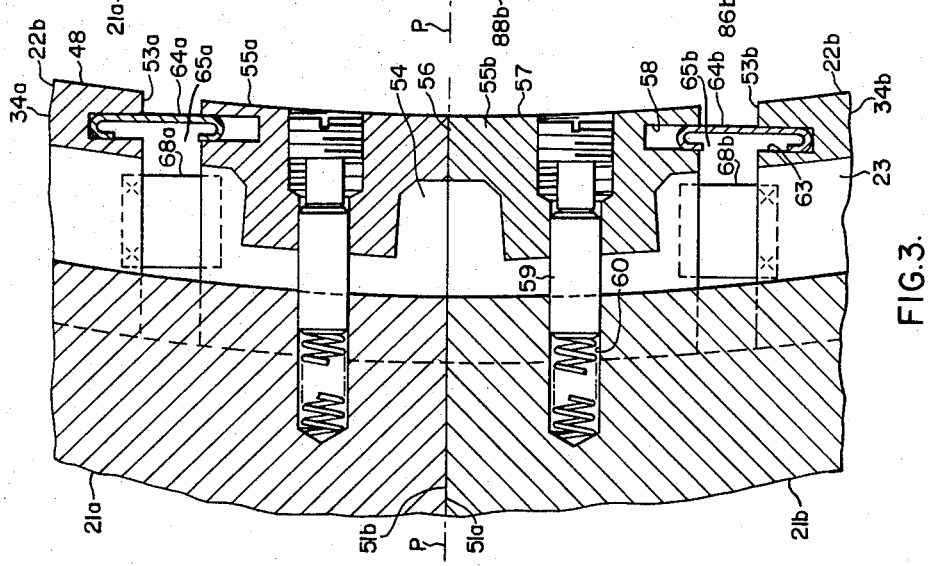

In operation, coolant fluid from any suitable source (not shown), such as pressurized air for example, is admitted to the annular space 23 between the inner and outer casings 21 and 22 by a conduit 50 connected to the outer casing 21. It is desirable for proper operation of the turbine that leakage of the hot motive gases from the flow passage 48 to the coolant fluid space 23 be prevented or at least minimized. Also, that leakage of the coolant fluid and/or motive gases through the outer casing 21 be prevented or minimized. To prevent leakage of such fluid through the outer casing 21, as best shown in FIGS. 3, 4 and 5, the upper and lower outer casing halves 21a–21b are provided with planar faces 51a and 51b, respectively, held in abutment with each other by the bolts 49, since thermal expansion of the outer casing is free to occur without stressing the internal components of the turbine. However, sealing of the upper and lower inner casing portions 22a and 22b in the horizontal plane P is more difficult, since the components thereof must be freely expansible and contractible within the confines of the outer casing without creating internal stresses while still effecting the required seal.

In accordance with the invention, as best shown in FIGS. 2 and 3, the upper and lower spacer ring portions 34a and 34b are of somewhat less than 180° angular extent so that both pairs of their juxtaposed end portions 53a and 53b are disposed above and below the plane P, respectively, and in endwise spaced relation with each other, as indicated by the space 54 therebetween.

A lower sealing block 55b, as best shown in FIGS. 3 and 6, having a planar face 56, an arcuate inner surface 57 conforming to the curvature of the lower spacer ring portion 34b and a lower recess or groove 58, is maintained with its planar face 56 in the plane P by a dowel pin 59 extending radially outwardly therefrom into a mating bore 60 in the outer casing half 21b. The block 55b is further provided with a pair of opposed tenons 62 received in the neighboring retaining rings 36 (FIG. 2).

The end portion 53b of the lower spacer ring portion is also provided with a recess or groove 63 disposed in opposed spaced relation with the groove 58 and a resilient seal member or strip 64b bridges the space 65b therebetween and is frictionally retained in the grooves 58 and 63. The seal member 64b is preferably of C-shaped cross-section and formed of spring steel, and extends the full width of the block 55b and the lower spacer ring portion 34b (see FIG. 2), but is free to slide in the vertical direction as viewed in FIG. 3.

The upper spacer ring portion 34a is similarly formed and provided with an upper sealing block 55a and a seal member 64a in the same manner.

Accordingly, as thus far described, it will now be apparent that the upper and lower sealing blocks 55a and 55b effect planar sealing abutment with each other, while the relatively fragile upper and lower seal strips 64a and 64b complete the seal and permit the upper and lower spacer ring portions 34a and 34b, respectively, to expand and contract peripherally while maintaining their sealing effect.

The spaces 65a and 65b between associated sealing blocks and spacer ring portions, permit the coolant fluid to flow in axial direction along the space 23 between the inner and outer shell structure 22 and 21, respectively, when viewed as in FIG. 1. To increase the pressure drop of the coolant fluid flow through these spaces 65a and 65b, small plate members 68a and 68b may, if desired, be affixed to the associated spacer ring portions in rearwardly lapping relation with the associated seal blocks (as illustrated in FIGS. 2 and 3).

The diametrically opposed end portions (not shown) of the upper and lower spacer ring portions 34a and 34b are preferably provided with sealing structure similar to that described above and shown in FIG. 3.

The divided diaphragms 24–27 may preferably employ substantially identical sealing structure. Accordingly, the sealing structure for the first divided diaphragm structure 24 will be described.

The upper and lower outer shroud ring portions 29a and 29b, as best shown in FIGS. 2 and 5, are also of somewhat less than 180° angular extent, but of greater angular extent than the spacer ring portions 34a and 34b, so that both pairs of their juxtaposed end portions 70a and 70b are disposed above and below the plane P, respectively, and in endwise spaced relation with each other, but to a lesser extent than the spacer ring portions 53a and 53b.

The neighboring upper and lower retaining ring portions 36a and 36b are of less than 180° angular extent to permit expansion and contraction thereof. The lower retainer ring portions 36b further include short arcuate segments 71b of the same cross-section as the ring portions and also received in the grooves 38. The segments 71b are maintained in flush relation with the plane P by lower sealing blocks 74b attached to the segments 71b by screws 72. Accordingly, an expansion space 73b is formed between the retainer ring segments 71b and the retainer ring portions 36b. The spaces 73b are sealed by the adjacent spring strips 64b.

By referring to FIG. 7, it will be seen that the lower sealing block 74b is provided with an upper planar face 75, a pair of counterbored holes 76 to receive the screws 72, a depending flange 77 normal to the plane surface 75 and a shortened flange portion 78 forming a continuation of the planar surface 75.

As best illustrated in FIG. 5, the flange portion 78 extends into the space between the end portions 70a and 70b of the shroud ring portions 29b and 29a but flush with the plane P, while the depending flange 77 is disposed in sliding abutment with the outer face 79b of the lower shroud ring portion 29b. Accordingly, the lower shroud ring portion 29b is free to expand and contract to the extent permitted by the clearance 80b between the flange 78 and the end portion 70b, while the flange 77 is maintained in sealing relation with the shroud ring face 79b.

The upper shroud ring portion 29a is provided with sealing structure similar to that described above in conjunction with the lower shroud ring portion 29b and employs an upper sealing block 74a that is an inverted mirror image of the block 74b, while the upper retainer ring portions 36a are provided with segments 71a similar to segments 71b. Hence this structure need not be further described. Also, the diametrically opposed end portions (not shown) of the upper and lower shroud ring portions 29a and 29b are provided with sealing structure similar to that shown in FIG. 5.

The first retaining ring structure 36 (with regard to direction of motive gas flow 28) is also divided into upper and lower arcuate portions 36a and 36b, as best shown in FIGS. 2 and 4, of less than 180° arcuate extent. Their end portions 82a and 82b are subtantially equidistantly spaced above and below the horizontal plane P. The upper and lower retaining ring portions 36a and 36b are retained in the respective outer casing halves 21a and 21b in a substantially identical manner, as will now be described.

A retaining ring segment 83b is retained in the lower outer casing half 21b and positioned therein with its upper planar face 84b in the horizontal plane P by a dowel pin 85b disposed below the plane P and seated in a mating bore 86b in the lower casing half 21b. The dowel pin extends toward the segment 83b into abutment with a downwardly facing shoulder 86b formed in the latter. The segment 83b is further provided with an upwardly facing shoulder 87b engaged by a screw 88b and the screw is threadedly received in the lower outer casing half 21b. The segment 83b is of less peripheral extent than the distance from the retaining ring end portion 82b to the horizontal plane P. Accordingly, a space 89b is provided between the retaining ring portion 36b and the retaining ring segment 83b for peripheral thermal expansion of the retaining ring portion 36b. If desired, a small blocking plate 90b similar to the plate 68a is attached to the end portion of the retaining ring portion 36b to restrict flow of coolant fluid through the space 89b.

The upper retaining ring portion 36a is provided with a retaining ring segment 83a similar to the retaining ring segment 83b but disposed in inverted relation therewith and positioned in the upper outer casing half 21a.

It will now be seen that the retaining ring structure 36, the diaphragm structure 24–27 and the spacer ring structure 34 are divided into arcuate portions of less than 180° arcuate extent with the arcuate portions expansibly and contractibly retained in their associated outer casing halves 21a and 21b, and that the fragile seal strips 64a and 64b are pre-assembled before the upper casing structure 12a is positioned on the lower casing structure 12b and are protected from damage by the associated sealing blocks 55a and 55b.

Further all seals on the horizontal plane P or plane of joinder between the upper and lower casing structure halves 12a and 12b are reliably obtained by planar abutment of sturdy metal members (blocks 55a, 55b, 74a and 74b, and retainer ring segments 71a, 71b, 83a and 83b).

It will further now be apparent that flow of coolant fluid admitted to the space 23 by the conduit 50 (FIG. 2) undergoes a series of small pressure drops as its flow through the series of spaces is partially blocked by the plates 68a and 68b (FIG. 3) and 90a and 90b (FIG. 4), thereby to maintain a substantially constant pressure difference with the pressure of the expanding motive fluid 28 (FIG. 1) and concomitantly controlled leakage of coolant fluid into the motive fluid path.

It will further now be seen that the described arrangement eliminates fluid leakage flow in a continuous direction, since the expansion spaces for the diaphragm structure and the spacer ring structure are not in line but are disposed out of continuous registry with each other. This feature reduces turbulent fluid flow and tends to reduce the even harmonic excitation of the turbine blades.

Accordingly, with the invention a highly improved seal structure is provided for the upper and lower turbine casing components that improves the performance characteristics of the turbine and extends the life of the heavily stressed rotor blades 13–16.

While the invention has been shown in one form, it will be obvious to those skilled in the art that it is not so limited, but is susceptible of various other changes and modifications without departing from the spirit thereof.

I claim as my invention:

1. A tubular casing structure divided in an axial plane into an upper casing half portion and a lower casing half portion,
    said casing portions having planar surfaces mating with each other along said axial plane,
    ring structure disposed in said casing structure and divided into at least two arcuate portions of less than 180 degrees and disposed in peripherally spaced relation with each other, and
    means interposed in at least one space between said arcuate ring portions for providing a seal restricting flow of pressurized fluid therepast,
    said means including a block having a planar face disposed in said axial plane and a resilient seal strip interposed between said block and one of said arcuate ring portions.

2. The structure recited in claim 1, wherein
    the one arcuate ring portion and the block have oppositely disposed slots, and
    the seal strip is slidably disposed in said slots.

3. The structure recited in claim 1, wherein
    the one arcuate ring portion and the block have oppositely disposed slots in spaced relation with each other, and
    the seal strip is of curvilinear cross-section and disposed in said slots with freedom to move therein during expansion and contraction of the arcuate ring portions.

4. A tubular casing structure for an axial flow elastic fluid utilizing machine, comprising
    an upper casing half,
    a lower casing half,
    said casing halves mating with each other along an axial plane,
    divided ring structure including upper and lower arcuate portions disposed in said upper and lower casing halves, respectively,
    means for maintaining said ring structure in inwardly-spaced relation with said casing structure,
    said arcuate portions being of less than 180 degrees angular extent and being disposed with at least one pair of their end portions in arcuately spaced relation with each other adjacent said axial plane, and
    means for yieldingly sealing the arcuate space between said end portions, comprising
    an arcuate block disposed in arcuately spaced relation with one of said arcuate portions, and
    a resilient seal member interposed between said block and said one arcuate portion.

5. The structure recited in claim 4, and further including
    an annular array of stator vanes,
    divided stator ring structure disposed in the upper and lower casing halves and carrying said stator vanes, and
    sealing means for restricting flow of fluid past said stator ring structure along the axial plane.

6. The structure recited in claim 4, wherein
    both pairs of end portions are disposed in endwise arcuately spaced relation with each other, and
    the sealing means includes a pair of arcuate blocks disposed in arcuately spaced relation with each pair of end portions and a pair of resilient seal members, one between each block and end portion, and
    the pair of arcuate blocks are provided with mutually abuttable planar faces disposed in the axial plane of the casing structure.

7. A tubular casing structure for an axial flow elastic fluid utilizing machine, comprising
an upper casing half,
a lower casing half,
said casing halves having a common central axis and surfaces mating with each other along a horizontal plane extending through said central axis,
a plurality of annular rows of stator vanes,
a plurality of ring structures alternately disposed between said rows of stator vanes,
annular retaining members interposed between neighboring stator vane rows and ring structures and effective to position the same in said casing halves,
said stator vanes, ring structures and retaining members jointly forming an annular flow path for elastic fluid, and being divided into upper and lower paired arcuate portions carried by said upper and lower casing halves, respectively,
at least one pair of arcuate ring portions being individually of less than 180 degrees angular extent and having their end portions in endwise arcuately spaced relation with each other adjacent said axial plane, thereby to provide a pair of diametrically opposed spaces, and
means for yieldingly sealing each of said arcuate spaces, comprising
a pair of blocks disposed on either side of said axial plane and disposed in mutual abutment, and
a resilient seal member interposed between each of said blocks and an associated arcuate ring portion and effective to permit thermal elongation and contraction of said associated ring portion.

8. The structure recited in claim 7, wherein
the blocks and the associated arcuate ring portions are provided with oppositely facing recesses, and
the seal members are flexible metal strips received in said recesses.

9. The structure recited in claim 7, wherein
the blocks and the associated arcuate ring portions are provided with oppositely facing recesses extending parallel to the central axis and in spaced relation with the horizontal plane, and
the seal members are flexible metal strips received in said recesses.

10. A tubular casing structure for an axial flow elastic fluid utilizing machine, comprising
an upper casing half,
a lower casing half,
said casing halves having a common central axis and surfaces mating with each other along a horizontal plane extending through said central axis,
a plurality of annular rows of stator vanes,
a plurality of spacer ring structures alternately disposed between said rows of stator vanes,
annular retaining members interposed between neighboring stator vane rows and spacer ring structures and effective to position the same in said casing halves,
said stator vanes, spacer ring structures and retaining members jointly forming an annular flow path for elastic fluid, and being divided into upper and lower paired arcuate portions carried by said upper and lower casing halves, respectively,
at least one pair of arcuate spacer ring portions being individually of less than 180 degrees angular extent and having their end portions in arcuately endwise spaced relation with each other adjacent said axial plane, thereby to provide a first pair of diametrically opposed spaces,
means for yieldingly sealing each of said first arcuate spaces, comprising
a first pair of blocks disposed on either side of said axial plane and disposed in mutual abutment, and
a resilient seal member interposed between each of said blocks and an associated arcuate spacer ring portion and effective to permit thermal elongation and contraction of said associated ring portion,
at least one row of stator vanes being provided with a pair of arcuate outer shroud portions of greater angular extent than said ring portions and having their end portions in closer arcuately spaced relation with each other adjacent said axial plane than said ring portions, thereby to provide a second pair of diametrically opposed spaces, and
sealing means for restricting flow of fluid through said second pair of spaces including a second pair of blocks disposed on either side of said axial plane and disposed in mutual abutment in said plane.

11. The structure recited in claim 10, wherein
the first blocks and the associated arcuate ring portions are provided with oppositely facing recesses, and
the seal members are flexible metal strips received in said recesses.

12. The structure recited in claim 10, wherein
the first blocks and the associated arcuate ring portions are provided with oppositely facing recesses extending parallel to the central axis and in spaced relation with the horizontal plane,
the seal members are flexible metal strips received in said recesses, and
the second blocks have oppositely extending flanges slidably overlapping the associated shroud portions and permitting elongation and contraction of the latter.

References Cited

UNITED STATES PATENTS

| | | | |
|---|---|---|---|
| 1,873,743 | 8/1932 | Doran | 253—39 |
| 2,991,045 | 7/1961 | Tossoni | 253—39 |
| 3,024,968 | 3/1962 | Payne et al. | 253—39 |

MARTIN P. SCHWADRON, *Primary Examiner.*

E. A. POWELL, JR., *Assistant Examiner.*